United States Patent
Hwang et al.

(10) Patent No.: US 10,725,158 B2
(45) Date of Patent: Jul. 28, 2020

(54) ULTRASONIC DEVICE AND ULTRASONIC IMAGING METHOD

(71) Applicants: SAMSUNG ELECTRONICS CO., LTD., Gyeonggi-do (KR); SOGANG UNIVERSITY RESEARCH & BUSINESS FOUNDATION, Seoul (KR)

(72) Inventors: Mun-kyeong Hwang, Suwon-si (KR); Tai-kyong Song, Seoul (KR); Yong-sup Park, Seoul (KR); Hyun-taek Lee, Seoul (KR); Kang-won Jeon, Seoul (KR); Sua Bae, Seoul (KR)

(73) Assignee: Sogang University Research & Business Foundation, Seoul (KR)

( * ) Notice: Subject to any disclaimer, the term of this patent is extended or adjusted under 35 U.S.C. 154(b) by 225 days.

(21) Appl. No.: 15/768,535

(22) PCT Filed: Oct. 13, 2016

(86) PCT No.: PCT/KR2016/011478
§ 371 (c)(1),
(2) Date: Apr. 13, 2018

(87) PCT Pub. No.: WO2017/065513
PCT Pub. Date: Apr. 20, 2017

(65) Prior Publication Data
US 2018/0299538 A1 Oct. 18, 2018

(30) Foreign Application Priority Data
Oct. 16, 2015 (KR) .................. 10-2015-0144513

(51) Int. Cl.
*G01S 15/89* (2006.01)
*G01S 7/52* (2006.01)

(52) U.S. Cl.
CPC ...... *G01S 7/52046* (2013.01); *G01S 7/52036* (2013.01); *G01S 7/52065* (2013.01);
(Continued)

(58) Field of Classification Search
CPC .. G01S 15/89; G01S 15/8995; G01S 7/52065; G01S 7/52036; G01S 7/52046; G01S 15/8915; G01S 7/52085
(Continued)

(56) References Cited

U.S. PATENT DOCUMENTS 4,841,489 A * 6/1989 Ozaki .................. G01S 7/5206
367/103
5,072,722 A * 12/1991 Granz .................. A61B 8/0833
600/439
(Continued)

FOREIGN PATENT DOCUMENTS

JP 2003-220059 A 8/2003
JP 2004-016666 A 1/2004
(Continued)

OTHER PUBLICATIONS

Gabriel Montaldo et al., "Coherent Plane-Wave Compounding for Very High Frame Rate Ultrasonography and Transient Elastography", IEEE Transactions on Ultrasonics, Ferroelectrics, and Frequency Control, vol. 56, No. 3, pp. 489-506, Mar. 2009 (19 pages).
(Continued)

Primary Examiner — Jacques M Saint Surin
(74) Attorney, Agent, or Firm — Osha Liang LLP

(57) ABSTRACT

An ultrasonic device provides a wider image to a user of the device and includes a transducer for transmitting a plane wave; and a processor for controlling the transducer to sequentially transmit plane waves in a plurality of different travelling directions and thereby extend a transmission range in which the plane waves travel, where the transducer
(Continued)

receives a plurality of ultrasonic signals which are reflected from an object by each of the transmitted plane waves, and the processor synthesizes the plurality of received ultrasonic signals so as to image at least a predetermined partial region in the extended transmission range.

13 Claims, 18 Drawing Sheets

(52) U.S. Cl.
CPC .......... *G01S 7/52085* (2013.01); *G01S 15/89* (2013.01); *G01S 15/8915* (2013.01); *G01S 15/8995* (2013.01)

(58) Field of Classification Search
USPC .......................................................... 73/629
See application file for complete search history.

(56) References Cited

U.S. PATENT DOCUMENTS

| | | | |
|---|---|---|---|
| 6,279,398 B1 | 8/2001 | Bae et al. | |
| 7,874,987 B2 | 1/2011 | Altmann et al. | |
| 8,715,188 B2 | 5/2014 | Willsie et al. | |
| 9,149,252 B2* | 10/2015 | Tashiro | A61B 8/0841 |
| 9,888,907 B2* | 2/2018 | Noguchi | A61B 8/5207 |
| 10,292,682 B2* | 5/2019 | Choi | A61B 8/485 |
| 10,448,925 B2* | 10/2019 | Kim | G01S 7/52085 |
| 2003/0060712 A1* | 3/2003 | Kawagishi | G01S 7/52038 600/458 |
| 2006/0241452 A1 | 10/2006 | Cerofolini | |
| 2007/0049825 A1 | 3/2007 | Lee et al. | |
| 2007/0106156 A1 | 5/2007 | Altmann et al. | |
| 2008/0071175 A1* | 3/2008 | Lee | G01S 7/52085 600/443 |
| 2009/0018441 A1 | 1/2009 | Willsie et al. | |
| 2010/0137716 A1 | 6/2010 | Liu et al. | |
| 2012/0143063 A1 | 6/2012 | Robinson | |
| 2013/0274608 A1* | 10/2013 | Takeda | A61B 8/0841 600/461 |
| 2015/0192547 A1* | 7/2015 | Lee | G01N 29/04 73/641 |

FOREIGN PATENT DOCUMENTS

| | | |
|---|---|---|
| KR | 2000-0018935 A | 4/2000 |
| KR | 2007-0022615 A | 2/2007 |
| KR | 2007-0045919 A | 5/2007 |
| KR | 2009-0006758 A | 1/2009 |
| KR | 10-1120691 B1 | 4/2012 |
| KR | 2015-0032058 A | 3/2015 |
| KR | 10-1551469 B1 | 9/2015 |
| WO | WO2017035838 * | 3/2017 |

OTHER PUBLICATIONS

Jong Pil Lee et al., "Analysis of Ultrasound Synthetic Transmit Focusing Using Plane Waves", The Journal of the Acoustical Society of Korea, vol. 33, No. 3, pp. 200-209, 2014 (10 pages).
Jin Ho Chang et al., "A New Synthetic Aperture Focusing Method to Suppress the Diffraction of Ultrasound", IEEE Transactions on Ultrasonics, Ferroelectrics, and Frequency Control, vol. 58, No. 2, pp. 327-337, Feb. 2011 (11 pages).
International Search Report issued in corresponding International Application No. PCT/KR2016/011478 dated Dec. 19, 2016, with translation (5 pages).
Written Opinion of the International Searching Authority issued in corresponding International Application No. PCT/KR2016/011478 dated Dec. 19, 2016, with translation (9 pages).

* cited by examiner

610

620

630

ULTRASONIC DEVICE AND ULTRASONIC IMAGING METHOD

TECHNICAL FIELD

Apparatuses and methods consistent with the present invention relate to an ultrasonic device and an ultrasonic imaging method, and more particularly, to an ultrasonic device and an ultrasonic imaging method for transmitting a plane wave and imaging an object by using ultrasonic signals reflected from the object by the transmitted plane wave.

BACKGROUND ART

An ultrasound apparatus is an apparatus that transmits an ultrasonic signal and, if the ultrasonic signal is reflected from an object, images a structure and a characteristic of the object by using information included in the reflected ultrasonic signal. There is a growing tendency to use the ultrasound apparatus with a noninvasive characteristic of the ultrasound apparatus, and thus there is a need for providing a high-quality image.

A transducer of the ultrasound apparatus that transmits an ultrasonic signal is roughly classified into a straight line type of linear transducer and a curved type of convex transducer.

If a plane wave is transmitted by using the linear transducer, the same number of scanning lines may be maintained per area all over a region to be imaged, and thus an image having a uniform resolution may be acquired. However, the region to be imaged by the linear transducer is relatively smaller than when using the convex transducer that will be described later and thus is inconvenient in terms of use and is difficult to be applied in some clinical application fields. In other words, if a plane wave is used, an image having a uniform resolution may be acquired, but a region to be imaged is relatively small.

If the convex transducer is used, an ultrasonic wave is transmitted in a radial form according to a curved shape of the convex transducer so as to acquire a relatively wider region to be imaged than when using the linear transducer. However, since the convex transducer uses a radial scanning method, the number of scanning lines per area is smaller as being far away from the convex transducer. As a result, a non-uniform image whose resolution is deteriorated and whose speckles become larger is provided.

Therefore, there is a need to secure a wide region, which has a uniform resolution and is to be imaged, by using a plane wave.

DETAILED DESCRIPTION OF THE INVENTION

Technical Problem

The present invention provides an ultrasonic device and an ultrasonic imaging method for using a plane wave, acquiring an extended region to be imaged, and preventing a resolution from being deteriorated.

Technical Solution

According to an aspect of the present invention, an ultrasonic device includes a transducer for transmitting a plane wave, and a processor for controlling the transducer to sequentially transmit plane waves in a plurality of different travelling directions and thereby extend a transmission range in which the plane waves travel, wherein the transducer receives a plurality of ultrasonic signals which are reflected from an object by each of the transmitted plane waves, and the processor synthesizes the plurality of received ultrasonic signals so as to image at least a predetermined partial region in the extended transmission range.

The processor may determine the extended transmission range based on a position, a resolution and a size of the region to be imaged, differently determine travelling directions of the plane waves so as to dispersedly transmit the preset number of plane waves in the extended transmission range, and control the transducer to transmit the plane waves in the determined travelling directions.

The processor may determine a point where an angle formed by a first straight line to a first end of both ends of the transducer and a second straight line to a second end as an opposite end of the both ends of the transducer is smallest, in the region to be imaged and determine a travelling direction of a plane wave passing through the both boundaries of the extended transmission range based on an angle at the determined point.

Angles $\theta_0$ and $\theta_{N-1}$, which are formed by travelling directions of plane waves passing through the both boundaries of the extended transmission range and a vertical line perpendicular to the transducer, may be respectively calculated through Equation below:

$$\theta_0 = \varphi_1 - R_{\theta,min}$$

$$\theta_{N-1} = \varphi_2 + R_{\theta,min}$$

wherein N denotes the number of a plurality of plane waves, $\varphi_1$ denotes an angle which has a negative number and a size formed by a third straight line to a first end among points extended toward the first end in the region to be imaged, a third straight line at a point where an angle formed by a vertical line perpendicular to the transducer 110 is largest, and a vertical line, $\varphi_2$ denotes an angle which has a positive number and a size formed by a fourth straight line to a second end among points extended toward the second end in the region to be imaged, and a fourth straight line at a point where an angle formed by a vertical line is largest, and the vertical line, and $R_{\theta,min}$ denotes a preset angle smaller than or equal to the angle at the determined point D.

An angle $\theta_N$ which is formed by the travelling directions of the plurality of plane waves and the vertical line may be calculated through Equation below:

$$\theta_n = \frac{\phi_2 - \phi_1 + 2R_{\theta,min}}{N-1} \times n + \phi_1 - R_{\theta,min}$$

wherein n=0, 1, 2, ..., N−1.

If a point through which the minimum number of plane waves pass is recognized among points in the at least predetermined partial region, the processor may image the at least predetermined partial region by synthesizing a plurality of reflected ultrasonic signals having the number corresponding to the minimum number at each of the points of the at least predetermined partial region.

The processor may image the at least predetermined partial region in the extended transmission range by setting a plurality of scanning lines at different scanning angles so as to correspond to a shape of the at least predetermined partial region and synthesizing a plurality of ultrasonic signals reflected from at least one point on the plurality of scanning lines.

The processor may image the at least predetermined partial region in the extended transmission range by setting a plurality of scanning lines to be parallel with one another in a direction perpendicular to the transducer and synthesizing a plurality of ultrasonic signals reflected from at least one point on the plurality of scanning lines.

The processor may image the at least predetermined partial region in the extended transmission range by setting a plurality of scanning lines to be parallel with one another in a direction perpendicular to the transducer in the at least predetermined partial region of the region to be imaged, setting the plurality of scanning lines at different scanning angles in a remaining region, and synthesizing a plurality of ultrasonic signals reflected from at least one point on the plurality of scanning lines.

According to another aspect of the present invention, an ultrasonic imaging method includes sequentially transmitting plane waves in a plurality of different travelling directions so as to extend a transmission range in which the plane waves travel, receiving a plurality of ultrasonic signals reflected from an object by each of the transmitted plane waves, and synthesizing the plurality of received ultrasonic signals so as to image at least a predetermined partial region in the extended transmission range.

The extending may include determining the extended transmission range based on a position, a resolution and a size of a region to be imaged, differently determining travelling directions of the plane waves so as to dispersedly transmit the preset number of plane waves in the extended transmission range, and transmitting the plane waves in the determined travelling directions.

The extending may include determining a point where an angle formed by a first straight line to a first end of both ends of a transducer and a second straight line to a second end as an opposite end of the both ends of the transducer is smallest, and determining a travelling direction of a plane wave passing through both boundaries of the extended transmission range based on an angle at the determined point.

Angles $\theta_0$ and $\theta_{N-1}$, which are formed by travelling directions of plane waves passing through the both boundaries of the extended transmission range and a vertical line perpendicular to the transducer, may be respectively calculated through Equation below:

$$\theta_0 = \varphi_1 - R_{\theta,min}$$

$$\theta_{N-1} = \varphi_2 + R_{\theta,min}$$

wherein N denotes the number of a plurality of plane waves, $\varphi_1$ denotes an angle which has a negative number and a size formed by a third straight line to a first end among points extended toward the first end in the region to be imaged, a third straight line at a point where an angle formed by a vertical line perpendicular to the transducer 110 is largest, and a vertical line, $\varphi_2$ denotes an angle which has a positive number and a size formed by a fourth straight line to a second end among points extended toward the second end in the region to be imaged, and a fourth straight line at a point where an angle formed by the vertical line is largest, and the vertical line, and $R_{\theta,min}$ denotes a preset angle smaller than or equal to the angle at the determined point D.

An angle $\theta_N$ which is formed by the travelling directions of the plurality of plane waves and the vertical line may be calculated through Equation below:

$$\theta_n = \frac{\phi_2 - \phi_1 + 2R_{\theta,min}}{N-1} \times n + \phi_1 - R_{\theta,min}$$

wherein n=0, 1, 2, ..., N−1.

The imaging may include, if a point through which the minimum number of plane waves travels is recognized among points in the at least predetermined partial region, synthesizing a plurality of reflected ultrasonic signals having the number corresponding to the minimum number at each of the points in the at least predetermined partial region so as to image the at least predetermined partial region.

The imaging may include may include imaging the at least predetermined partial region in the extended transmission range by setting a plurality of scanning lines at different scanning angles so as to correspond to a shape of the at least predetermined partial region and synthesizing a plurality of ultrasonic signals reflected from at least one point on the plurality of scanning lines.

The imaging may further include imaging the at least predetermined partial region in the extended transmission range by setting a plurality of scanning lines to be parallel with one another in a direction perpendicular to a transducer and synthesizing a plurality of ultrasonic signals reflected from at least one point on the plurality of scanning lines.

The imaging may further include imaging the at least predetermined partial region in the extended transmission range by setting a plurality of scanning lines to be parallel with one another in a direction perpendicular to the transducer in a partial region of a region to be imaged, setting the plurality of scanning lines at different scanning angles in a remaining region, and synthesizing a plurality of ultrasonic signals reflected from at least one point on the plurality of scanning lines.

Effects of the Invention

According to various exemplary embodiments of the present invention as described above, an ultrasonic device may extend a transmission range in which plane waves travel so as to correspond to a region a user wants to image and thereby provide an extended region which is to be imaged and provides a uniform resolution at each point.

BEST MODE OF THE INVENTION

Mode of the Invention

Figure 1:
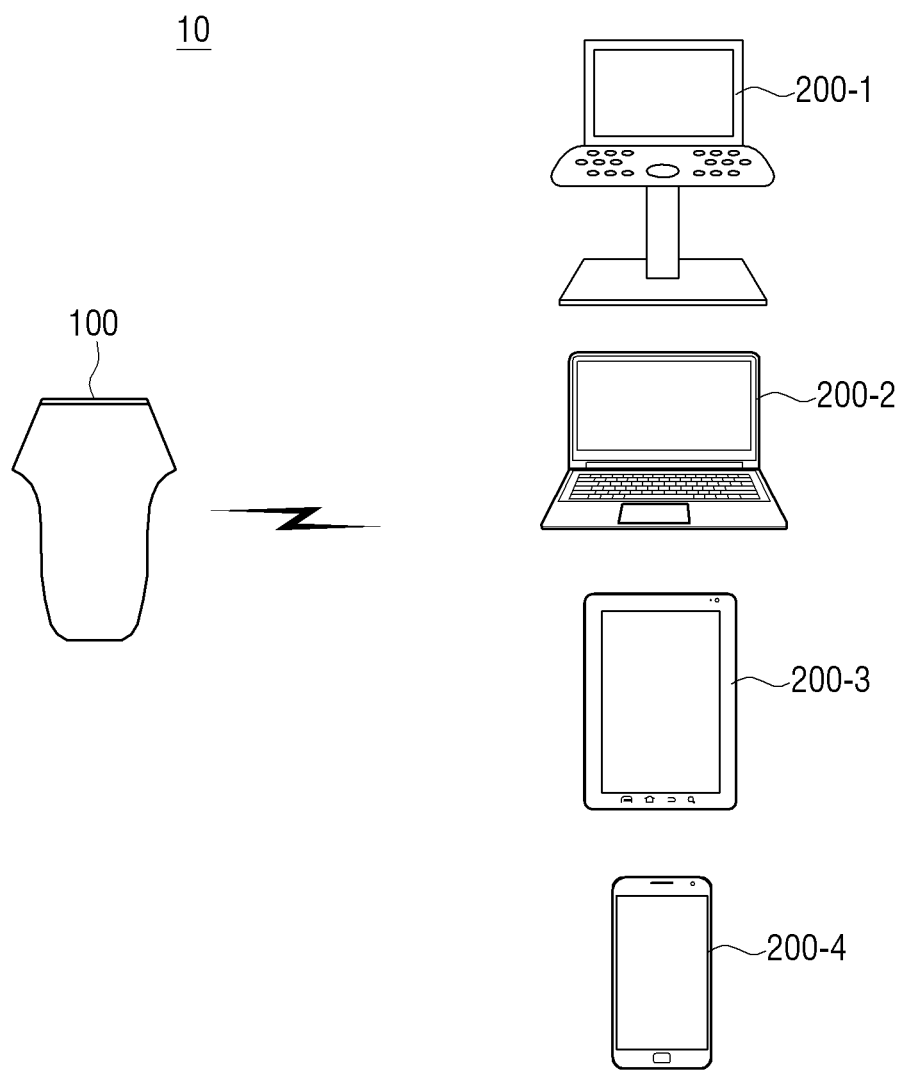
FIG. 1 is a view illustrating an ultrasonic system according to an exemplary embodiment of the present invention.

Hereinafter, while various exemplary embodiments are capable of various modifications and alternative forms, embodiments thereof are shown by way of example in the drawings and will herein be described in detail. It may be understood, however, that there is no intent to limit exemplary embodiments to the particular forms disclosed, but on the contrary, exemplary embodiments are to cover all modifications, equivalents, and alternatives falling within the scope of the invention. Like numbers refer to like elements throughout the description of the figures.

Although the terms, 'first', 'second', etc. may be used herein to describe various elements regardless of orders and/or importances, these elements may not be limited by these terms. These terms are only used to distinguish one element from another. For example, a first element may be termed a second element, and, similarly, a second element may be termed a first element, without departing from the scope of exemplary embodiments.

It will be understood that when an element (e.g., a first element) is referred to as being operatively or communicatively coupled with/to or connected to another element (e.g., a second element), the element may be connected to the another element directly or through another element (e.g., a third element). In contrast, when an element (e.g., a first element) is referred to as being "directly coupled with/to" or "directly connected to" another element (e.g., a second element), there are no intervening element (e.g., a third element) between the element and the another element.

The terminology used herein is for the purpose of describing particular embodiments only and is not intended to be limiting of exemplary embodiments. As used herein, the singular forms are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein. The terminology defined herein may not be interpreted as excluding exemplary embodiments of the present disclosure.

Hereinafter, various exemplary embodiments of the present invention will be described in detail with reference to the attached drawings.

FIG. 1 is a view illustrating an ultrasonic system 10 according to an exemplary embodiment of the present invention. The ultrasonic system 10 includes an ultrasonic device 100 and a display apparatus 200.

The ultrasonic device 100 refers to a device capable of transmitting an ultrasonic signal and receiving the ultrasonic signal reflected from an object so as to image a structure or a shape of the object. The ultrasonic device 100 may be used as various types of medical devices, cameras, cleaning devices, object tracking sensors, or the like. If the ultrasonic device 100 is a medical device, an object may be a human body or the like. Alternatively, the object may be an object whose structure or shape may be imaged by using an ultrasonic signal.

The ultrasonic device 100 generates an ultrasonic signal and transmits the ultrasonic signal to the object. Here, the ultrasonic device 100 may transmit the ultrasonic signal so as to generate image data having a first frame rate. For example, the ultrasonic device 100 may transmit the ultrasonic signal so as to acquire 3,000 pieces of image data per second.

Also, the ultrasonic device 100 receives the ultrasonic signal reflected from the object so as to acquire ultrasonic data and converts analog ultrasonic data into a digital signal.

In addition, the ultrasonic device 100 perform image processing (e.g., demodulation and decimation) with respect to the ultrasonic data having a digital signal form so as to generate a plurality of pieces of image data.

The ultrasonic device 100 also generates a plurality of pieces of synthesized image data by synthesizing the plurality of pieces of image data so as to have a second frame rate in order to transmit the plurality of pieces of image data to the external display apparatus 200. For example, if 3,000 pieces of image data are generated per second, the ultrasonic device 100 may generate 100 pieces of synthesized image data by synthesizing 30 pieces of image data. Here, the ultrasonic device 100 may generate a plurality of pieces of synthesized image data by synthesizing a plurality of pieces of image data in consideration of a resolution of image data and a frame rate at which communication with the external display apparatus 200 is possible.

The ultrasonic device 100 may also transmit the generated synthesized image data to the external display apparatus 200. Here, the ultrasonic device 100 may wirelessly transmit image data by transmitting digital synthesized image data to the external display apparatus 200. Also, although the ultrasonic device 100 uses wire, volume and weight are more reduced than lines for transmitting an existing analog signal.

The display apparatus 200 processes the synthesized image data received from the ultrasonic device 100 and outputs the processed synthesized image data as audio or video. Here, the display apparatus 200 may control a size of the synthesized image data in consideration of a resolution of the display apparatus 200.

According to an exemplary embodiment of the present invention, the display apparatus 200 may be realized as a display apparatus 200-1, a PC 200-2, a tablet PC 200-3, or a smartphone 200-4 used for an ultrasonic system as shown in FIG. 1. However, this is merely an exemplary embodiment, and the display apparatus 200 may be realized as other types of apparatuses.

Also, the ultrasonic device 100 may transmit the synthesized image data to one display apparatus 200, but this is merely an exemplary embodiment. Therefore, the ultrasonic device 100 may transmit the synthesized image data to a plurality of display apparatuses 200.

By the ultrasonic system 10 as described above, a user may be more conveniently provided with a diagnosis service using ultrasonic waves.

Figure 2A:
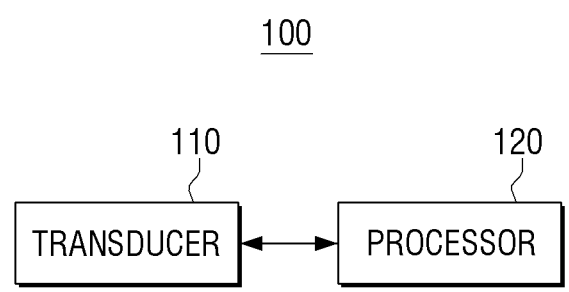
FIGS. 2A and 2B are block diagrams of an example of a configuration of an ultrasonic device.
Figure 2B:
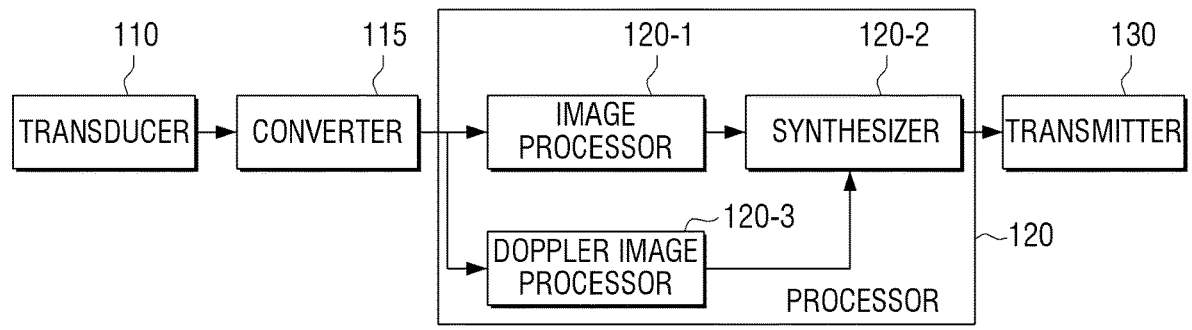

FIGS. 2A and 2B are block diagrams illustrating an example of a configuration of the ultrasonic device 100.

FIG. 2A is a block diagram of a simple configuration of the ultrasonic device 100 according to an exemplary embodiment of the present invention. As shown in FIG. 2A, the ultrasonic device 100 includes a transducer 110 and a processor 120.

The transducer 110 includes a plurality of transducer elements which operate so as to interconvert an electric signal and an ultrasonic signal. The transducer 110 transmits an ultrasonic signal to an object. The ultrasonic signal may be a plane wave signal or a focused signal but will be described as being used as the plane wave signal hereinafter. A plane wave refers to a wave which travels with forming a shape of a wave front thereof as a straight line or a plane.

In particular, under control of the processor 120, the transducer 110 may sequentially transmit plane waves in a plurality of different travelling directions and thereby extend a transmission range in which the plane waves travel. A method of the transducer 110 transmitting the plane waves in the plurality of different travelling directions will be described in detail later.

The transducer 110 may receive plane waves generated by a pulser (not shown) and transmit the plane waves to the object. The pulser may be included in the transducer 110 or may be provided separately from the transducer 110. Hereinafter, for convenience of description, the transducer 110 will be described as an element including the pulser.

If the plane waves transmitted from the transducer 100 crashed into the object, the plane waves may be reflected from the object so as to be dispersed in various directions. At least some of dispersed reflected signals may travel toward the transducer 110. Therefore, the transducer 110 may receive ultrasonic signals reflected from the object. Since the transducer 110 transmits a plurality of plane waves in various travelling directions as described above, a plurality of ultrasonic signals may be reflected. In other words, the transducer 110 receives a plurality of ultrasonic signals reflected from the object by each of the transmitted plane waves.

The processor 120 is an element for controlling an operation of the transducer 110.

The processor 120 may control a transmission of an ultrasonic signal. The processor 120 may form an electric signal for acquiring an ultrasonic image in consideration of the transducer 110. For example, the processor 120 may determine a timing for transmitting an ultrasonic signal of each of a plurality of transducer elements of the transducer 110.

The processor 120 may form plane waves by respectively differently determining timings for transmitting ultrasonic signals and determine travelling directions of the plane waves.

The processor 120 may control the transducer 110 to sequentially transmit the plane waves in a plurality of different travelling directions. Also, if the transducer 110 receives a plurality of ultrasonic signals, the processor 120 may generate an image of an object by synthesizing the received ultrasonic signals. If the transducer 110 transmits plane waves in a plurality of directions as described above, a transmission range may be extended more than when transmitting the plane waves in one direction. In the present specification, this will be referred to as an extended transmission range. The processor 120 may image at least a predetermined partial region in the extended transmission range as described above. A region to be imaged may be set by the user but may be set by default. Also, the processor 120 may image merely a partial region in the extended transmission range or may image the whole extended transmission range differently from this. A plane wave transmission direction of the transducer 110 may be determined by the processor 120.

The processor 120 may image the at least predetermined partial region by using the reflected ultrasonic signals received by the transducer 110. The processor 120 generate information about each of the at least predetermined partial regions by using transmission times of the ultrasonic signals, reception times of the reflected ultrasonic signals, and speeds of ultrasonic waves. The processor 120 also transmits the ultrasonic signals by changing travelling directions and generates information about each of the at least predetermined partial region by using the received ultrasonic signals. The processor 120 may synthesize and image information of a plurality of ultrasonic signals for an overlapping region by going through the same number of processes as the number of a plurality of plane waves.

The processor 120 may determine the extended transmission range based on a position and a size of a region to be imaged, determine respectively differently travelling directions of the preset number of plane waves so as to dispersedly transmit the preset number of plane waves in the extended transmission range, and control the transducer 110 to transmit the plane waves in the determined travelling directions. The region to be imaged may be adjacent to the transducer 110 but is not limited thereto. For example, the region to be imaged may be a region starting from a point keeping a predetermined distance from the transducer 110.

The processor 120 may determine the travelling directions of the plane waves according to various methods.

For example, if a region to be imaged is determined, the processor 120 may determine travelling directions of plane waves based on corner points among respective points in the region to be imaged. In detail, the processor 120 determines a point where an angle formed by a first straight line to a first end of both ends of the transducer 110 and a second straight line to a second end as an opposite end of the both ends of the transducer 110 is smallest. The processor 120 may determine a travelling direction of a plane wave, which passes through both boundaries of the extended transmission range, based on the angle formed by the first and second straight lines at the determined point. If the travelling direction of the plane wave passing through the both boundaries is determined, the processor 120 may determine travelling directions of remaining plane waves.

If a point through which the minimum number of plane waves travel is recognized among respective points in the at least predetermined partial region, the processor 120 may image the at least predetermined partial region by synthesizing a plurality of reflected ultrasonic signals having the number corresponding to the minimum number by each of the respective points in the at least predetermined partial region. In this case, the processor 120 may maintain a uniform resolution all over the region to be imaged.

The processor 120 may synthesize a plurality of ultrasonic signals reflected from merely a preset point not from all points in the at least predetermined partial region. The processor 120 may set a virtual line in the at least predetermined partial region and synthesize a plurality of ultrasonic signals reflected from merely a point on the set line. Hereinafter, the virtual line is referred to as a scanning line.

The processor 120 may image the at least predetermined partial region in the extended transmission range by setting a plurality of scanning lines at different scanning angles so as to correspond to a shape of the at least predetermined partial region and synthesizing a plurality of ultrasonic signals reflected from at least one point on the plurality of scanning lines.

Alternatively, the processor 120 may image the at least predetermined partial region in the extended transmission range by setting a plurality of scanning lines in a direction perpendicular to the transducer 110 so as to be parallel with one another and synthesizing a plurality of ultrasonic signals reflected from at least one point on the plurality of scanning lines.

Alternatively, the processor 120 may image the at least predetermined partial region in the extended transmission range by setting a plurality of scanning lines in a direction perpendicular to the transducer 110 so as to be parallel with one another in a partial region of a predetermined region to be imaged, setting the plurality of scanning lines at different scanning angles in a remaining region, and synthesizing a plurality of ultrasonic signals reflected from at least one point on the plurality of scanning lines.

FIG. 2B is a block diagram of a detailed configuration of the ultrasonic device 100 according to an exemplary embodiment of the present invention. As shown in FIG. 2B, the ultrasonic device 100 may include the transducer 110, a converter 115, the processor 120, and a transmitter 130, and the processor 120 may include an image processor 120-1, a synthesizer 120-2, and a doppler image processor 120-3.

The transducer 110 generates an ultrasonic signal having a plane wave form, transmits the ultrasonic signal to an object, and acquires ultrasonic data by receiving the ultrasonic signal reflected from the object. A detailed description of the transducer 110 is repeated and thus is omitted herein.

The converter 115 converts analog ultrasonic data acquired by the transducer 110 into digital form by using an Analog/Digital Converter (ADC).

The processor 120 may control an overall operation of the ultrasonic device 100. In particular, the processor 120 may control an ultrasonic signal transmission timing of the transducer 110.

The processor 120 may also perform various types of image processing jobs to transmit synthesized image data to the external display apparatus 200. In particular, the processor 120 may include the image processor 120-1, the synthesizer 120-2, and the doppler image processor 120-3 for image processing jobs.

The image processor 120-1 may generate a plurality of pieces of image data by performing image-processing with respect to pieces of digital ultrasonic data which are consecutively input. Here, the image processor 120-1 may perform image processing jobs such as demodulation and decimation.

The synthesizer 120-2 may generate a plurality of pieces of synthesized image data by synthesizing a plurality of pieces of image data generated by the image processor 120-1.

Here, the synthesizer 120-2 may synthesize image data in consideration of a resolution of synthesized image data. In detail, if image data is generated by using ultrasonic waves, image data having many frames may be acquired, and a plurality of pieces of image data may be synthesized so as to increase a resolution of the image data and lower a signal-to-noise ratio. Therefore, the synthesizer 120-2 may generate synthesized image data by synthesizing image data having preset frames or more. For example, the synthesizer 120-2 may generate synthesized image data by synthesizing image data having 100 frames or more. Here, the synthesizer 120-2 may determine the number of frames of image data which is to be synthesized according to an input of the user.

The synthesizer 120-2 may also synthesize image data in consideration of a frame rate at which a transmission to the external display apparatus 200 is possible. For example, if the transmitter 130 is able to transmit merely 100 frames to the external display 100 per one second, the synthesizer 120-2 may synthesize image data as synthesized image data having 100 frames or less per second.

Here, the number of synthesized frames considering a resolution and a transmissible frame rate of the external display apparatus 200 may be independently determined. For example, if 5,000 pieces of image data are generated per second, 100 pieces of synthesized image data are transmitted to the external display apparatus 200 per second, the synthesizer 120-2 does not necessarily need to synthesize 50 pieces of image data as one piece of synthesized image data. In other words, the synthesizer 120-2 may generate 50 pieces of synthesized image data according to a method of synthesizing $1^{st}$ image data through 50th image data as $1^{st}$ synthesized image data and synthesizing $51^{st}$ image data through 100th image data as $2^{nd}$ image data. However, this is merely an exemplary embodiment, the synthesizer 120-2 may generate 50 pieces of synthesized image data according to a method of synthesizing $1^{st}$ image data through 100th image data as $1^{st}$ synthesized image data and synthesizing $51^{st}$ image data through 130th image data as $2^{nd}$ synthesized image data.

As described above, synthesized image data having various resolutions and frame rates may be generated by synthesizing image data according to various methods and thus may be applied to various types of applications.

The doppler image processor 120-3 generate a plurality of doppler images by performing doppler processing with respect to each of ultrasonic data which are a plurality of digital signals. Here, the doppler processing may include at least one selected from color doppler processing, B-mode image processing, and spectral doppler processing.

Here, the doppler image processor 120-3 may generate a dynamic image by using a doppler filter.

The doppler image processor 120-3 may also output doppler image data, which is processed by the doppler image processor 120-3, to the synthesizer 120-2. Also, the synthesizer 120-2 may synthesize the doppler image data so as to have preset frames and transmit the synthesized doppler image data to the display apparatus 200. As described above, doppler image data may be generated and then synthesized so as to be transmitted to the external display apparatus 200. However, this is merely an exemplary embodiment, doppler image data may be generated by using synthesized image data.

The transmitter 130 transmits at least one of the synthesized image data and the doppler image data to the external display apparatus 200. Here, the transmitter 130 may transmit the synthesized image data or the doppler image data according to a wired or wireless method. For example, the transmitter 130 may transmit the synthesized image data by using a wireless communication module such as Wifi, Bluetooth, UWB, WiGig, Zigbee, or the like or may transmit the synthesized image data by using a wired communication module such as IEEE 1394, USB, or the like.

Also, the transmitter 130 may transmit the synthesized image data or the doppler image data to the external display apparatus 200 and an external cloud server or a hospital server.

In addition, the ultrasonic device 100 may include a wireless charger (not shown), a power supply unit (not shown), a sensor (not shown), a motion recognizer (not shown), a voice recognizer (not shown), a self-charger (not shown), and the like in order to increase use convenience.

The user may be provided with an ultrasonic diagnosis service more conveniently by using the ultrasonic device 100 as described above. Hereinafter, an exemplary embodiment for extending a region to be imaged and having a uniform resolution by changing travelling directions of plane waves will be described.

FIGS. 3A through 3E are views illustrating an example of a method of changing a travelling direction of a plane wave and then transmitting the plane wave.

Figure 3A:
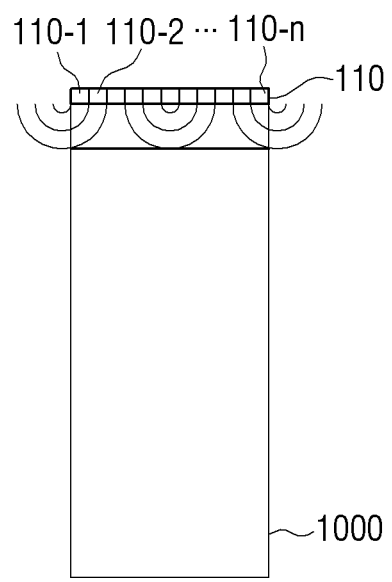
FIGS. 3A through 3E are views illustrating an example of a method of changing a travelling direction of a plane wave and then transmitting the plane wave.

FIG. 3A illustrate a plane wave having a travelling direction perpendicular to the transducer 110. The processor 120 may control the transducer 110 to transmit a plane wave having a travelling direction perpendicular to the transducer 110. The transducer 110 may include a plurality of elements 110-1, 110-2, . . . , and 110-n. The processor 120 may control the transducer 110 to simultaneously transmit a plurality of ultrasonic waves from the plurality of elements 110-1, 110-2, . . . , and 110-n so as to transmit a plane wave having a travelling direction perpendicular to the transducer 110.

Figure 3B:
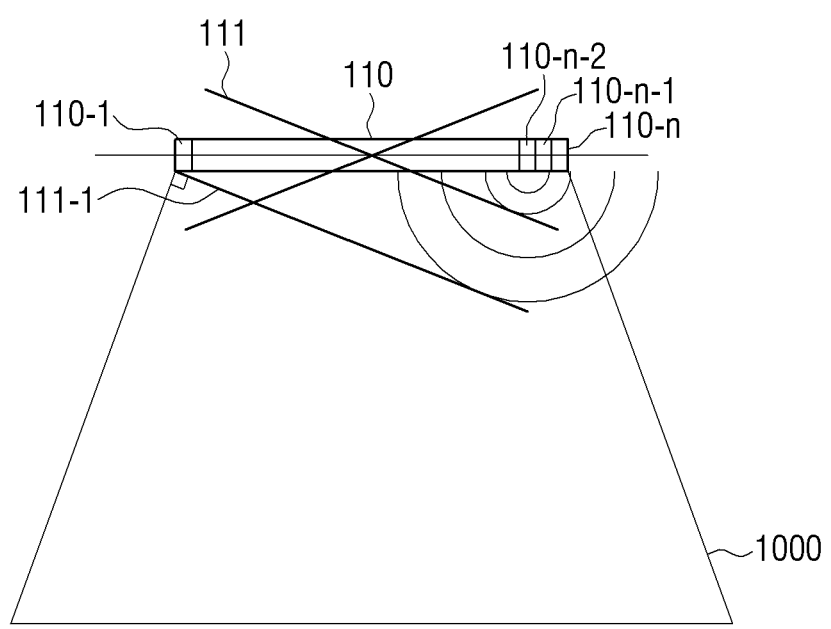

FIG. 3B illustrates a plane wave having a travelling direction slanting toward a left side of the transducer 110. The processor 120 may control the transducer 110 to transmit a plane wave having a plurality of travelling directions. The processor 120 may sequentially transmit a plurality of ultrasonic waves from the plurality of elements 110-1, 110-2, . . . , and 110-n so as to change a travelling direction of a plane wave. For example, the processor 120 may transmit an ultrasonic wave from the first element 110-1 according to a method of transmitting an ultrasonic wave from the $n^{th}$ element 110-n and then transmitting an ultrasonic wave from an n-$1^{st}$ element 110-n-1 in order to generate a plane wave like a wave front 111 of FIG. 3B. A few delays may occur at times where respective elements transmit ultrasonic waves.

The processor 120 may set a delay so as to enable the first element 110-1 to transmit an ultrasonic wave at a moment in time when the ultrasonic wave transmitted by the $n^{th}$ element 110-n is positioned on a wave front 111-1. Therefore, the processor 120 may transmit a plane wave whose wave front is not parallel with the transducer 110 and which has a plurality of travelling directions.

The processor 120 may image a region wider than a region of FIG. 3A through the above-described method. Therefore, an area of an object which is imaged may widen.

Figure 3C:
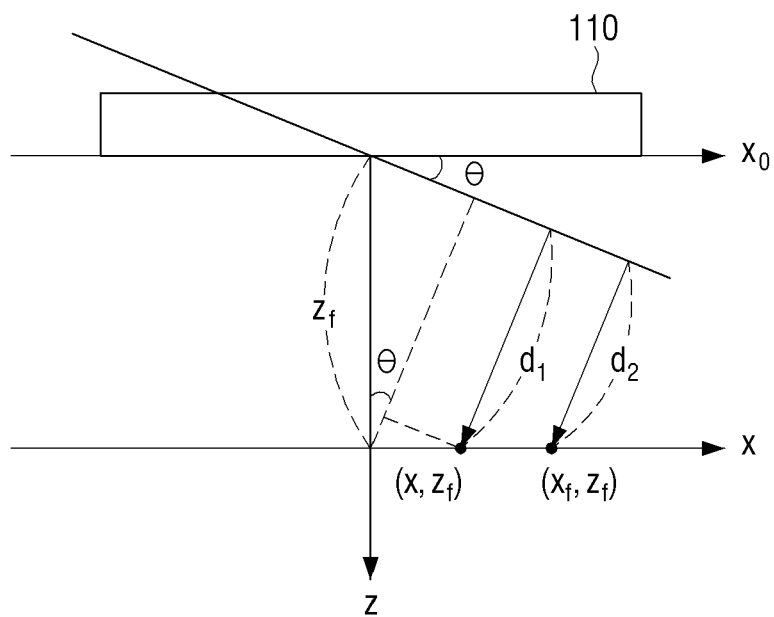
Figure 3D:
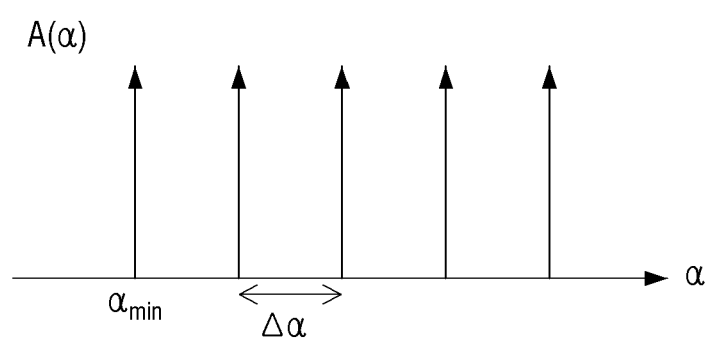
Figure 3E:
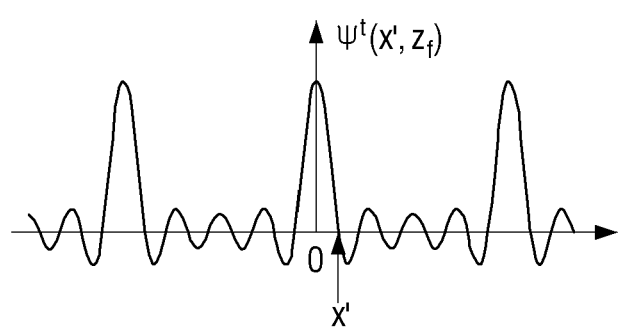

FIGS. 3C through 3E illustrate a resolution when transmitting a plane wave having a plurality of travelling directions.

FIG. 3C illustrate a plane wave having a wave front slanting from the transducer 110 by θ. Here, a transmission beam pattern at a point (x, $z_f$) may be expressed as in Equation 1 below:

$$\varphi_0^t(x,z_f)=e^{-j\omega t}e^{jkd1}, d1=z_f\cos\theta - x\sin\theta$$

$$\varphi_0^t(x,z_f)=\varphi_\alpha^t(x,z_f)=e^{-j\omega t}e^{jkz\beta}e^{-jkx\alpha} \quad (1)$$

wherein α=sin θ, and β=cos θ

When an angle function of all plane waves is A(α), and a transmission delay applied to each plane wave is τ($x_f$, $z_f$, α), a synthesized beam pattern at a point ($x_f$, $z_f$) may be expressed as in Equation 2 below:

$$\phi^t(x, z_f) = \int_{-\infty}^{\infty} A(\alpha)\tau(x_f, z_f, \alpha)\phi_\alpha^t(x, z)d\alpha = \int_{-\infty}^{\infty} A(\alpha)e^{-jkd2}\phi_\alpha^t(x, z)d\alpha \quad (2)$$

$$\phi^t(x, z_f) = \int_{-\infty}^{\infty} A(\alpha)e^{-jkz_f\beta}\phi_\alpha^t(x, z)d\alpha$$

$$\phi^t(x, z_f) = e^{-j\omega t}FT[A(\alpha)]_{f_x=\frac{x-x_f}{\lambda}}$$

wherein FT denotes Fourier Transform.

Also, an angle function may be expressed as in Equation 3 below and is illustrated in FIG. 3D.

$$A(\alpha) = \sum_{m=0}^{N_\alpha - 1} \delta(\alpha - \alpha_n) \quad (3)$$

$$\alpha_n = \alpha_{min} + \Delta\alpha \cdot n (n = 0, 1, 2, \ldots, N_\alpha - 1)$$

If Equations 2 and 3 are summarized, the synthesized beam pattern may be expressed as in Equation 4 and is illustrated in FIG. 3E.

$$\psi^t(x', z_f) = c_0 \frac{\sin(kx'N_\alpha\Delta\alpha/2)}{\sin(kx'\Delta_\alpha/2)} - jkx'\left(\alpha_{min} + (N_\alpha - 1)\frac{\Delta\alpha}{2}\right) \quad (4)$$

$$x' = x - x_f$$

Referring to FIG. 3E, an ultrasonic signal is focused on x' axis based on a point ($x_f$, $z_f$), a main lobe is positioned in a position of x'=0, and a grating lobe having the same strength as the main lobe appears at a preset distance. An ultrasonic signal having a size of the main lobe is reflected and received at the point ($x_f$, $z_f$), and an ultrasonic signal having a size of the grating lobe is reflected and received in a position which is not the point ($x_f$, $z_f$). In other words, the ultrasonic signal having the size of the main lobe may be an important signal, and as the size of the main lobe is large, and the point x' of FIG. 3E is small, a high-quality image may be acquired. A value of x' whose synthesized beam pattern becomes 0 in Equation 4 is expressed as in Equation 5 below:

$$x' = \frac{\lambda}{N_\alpha\Delta_\alpha} \quad (5)$$

Therefore, as $N_\alpha$ and Δα are large, a high-quality image may be acquired.

Hereinafter, descriptions will be focused on $N_\alpha$ will be focused. In other words, as there are many plane waves which pass through a particular point, a high-quality image may be acquired.

A supposition about α=sin θ is made in FIGS. 3A through 3E for easy developments of equations, but α and θ may be understood as similar meanings.

Figure 4A:
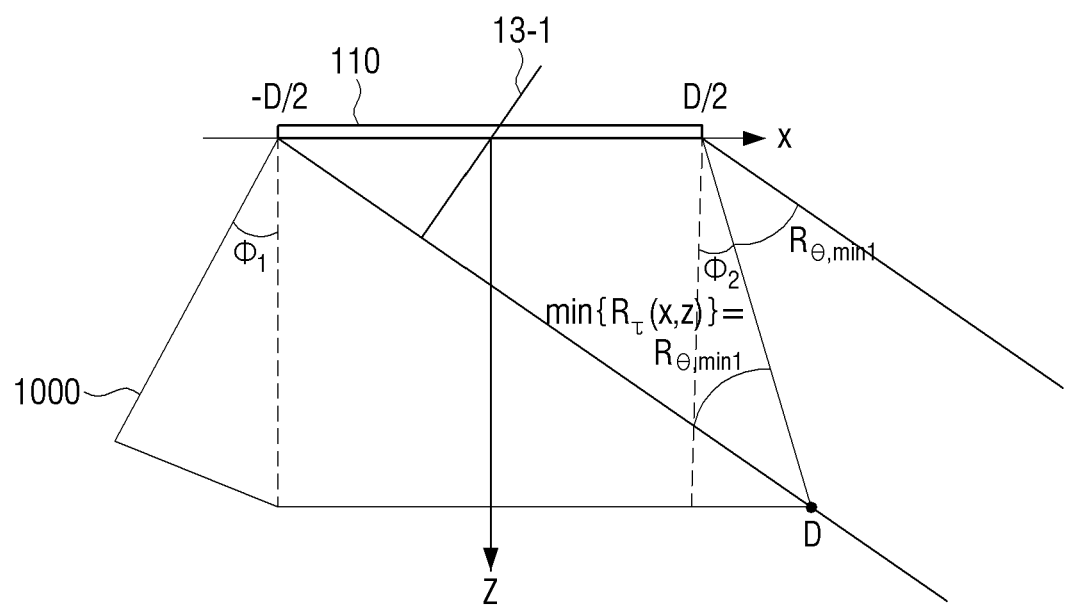
FIGS. 4A and 4B are views illustrating an example of a method of determining a transmission range in which plane waves travel.
Figure 4B:
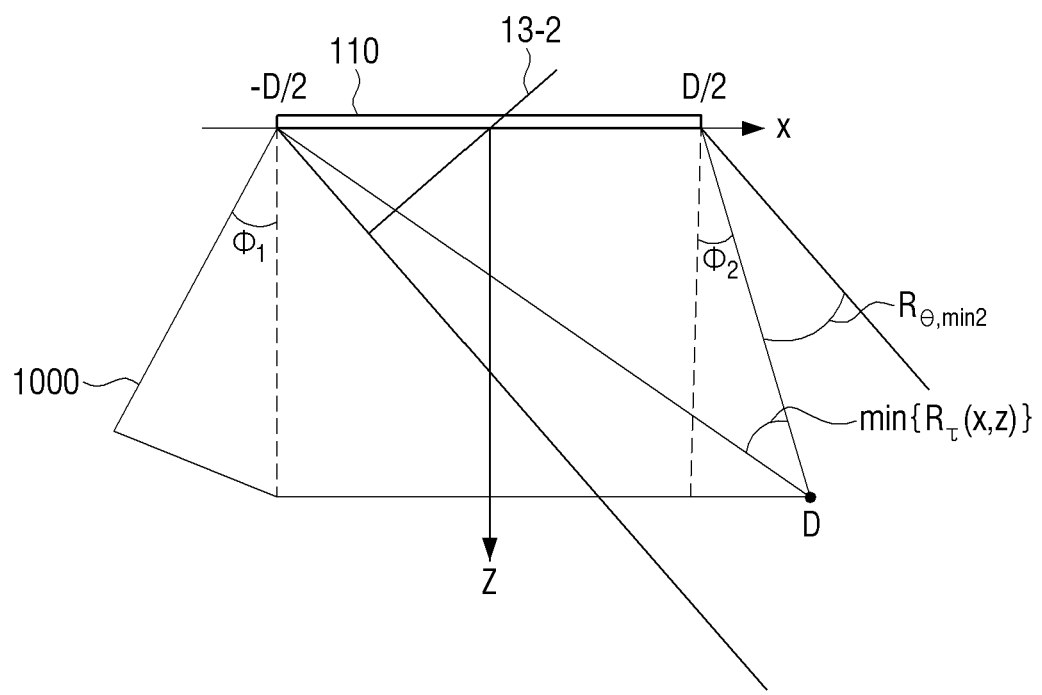

FIGS. 4A and 4B are views illustrating an example of a method of determining a transmission range in which plane waves travel.

The processor 120 may determine an extended transmission range based on a position and a size of a region 1000 to be imaged, differently determine travelling directions of plane waves so as to dispersedly transmit the preset number of plane waves in the extended transmission range, and control the transducer 110 to transmit plane waves in the determined travelling directions.

Here, the processor 120 may determine a point, at which an angle formed by a first straight line to a first end of both ends of the transducer 110 and a second straight line to a second end as an opposite end of the both ends of the transducer 110 is smallest, among points of the region 1000 to be imaged and determine a travelling wave of a plane wave which passes through both boundaries of the extended transmission range based on the angle at the determined pointing. For example, the processor 120 may determine a point D, which is farthest from the transducer 110, among points in the region 1000 to be imaged.

The processor 120 may respectively calculate a travelling direction of a plane wave passing through the both boundaries of the extended transmission range and angles $\theta_0$ and $\theta_{N-1}$ formed by vertical lines perpendicular to the transducer 110 through Equation 6 below:

$$\theta_0 = \varphi_1 - R_{\theta,min}$$

$$\theta_{N-1} = \varphi_2 + R_{\theta,min} \quad (6)$$

wherein N denotes the number of a plurality of plane waves, $\varphi_1$ denotes an angle which has a negative number and a size formed by a third straight line to a first end among points extended toward the first end of the region 1000 to be imaged, a third straight line at a point where an angle formed by a vertical line perpendicular to the transducer 110 is largest, and a vertical line, $\varphi_2$ denotes an angle which has a positive number and a size formed by a fourth straight line to a second end among points extended toward the second end of the region 1000 to be imaged, and a fourth straight line at a point where an angle formed by a vertical line is largest, and the vertical line, and $R_{\theta,min}$ denotes a preset angle smaller than or equal to the angle at the determined point D.

FIG. 4A illustrates $R_{\theta,min}$ which the an angle at the determined point D. In other words, if an angle formed by a travelling direction of a plane wave passing through a right boundary of the transducer 110 and a vertical line perpendicular to the transducer 110 is $\theta_{N-1}$, a wave front of the plane wave is kept parallel with a wave front 13-1 and passes through the point D positioned on the right boundary of the region 1000 to be imaged.

If $R_{\theta,min}$ is larger than the angle at the determined point D, $\theta_{N-1}$ becomes slightly larger, and the travelling direction of the plane wave a little more slants toward the right side. In this case, the plane wave passing through the right boundary does not pass through the point D positioned on the right boundary of the region 1000 to be imaged, and the number of plane waves passing through the point D positioned on the right boundary as described above is reduced, thereby lowering a resolution.

FIG. 4B illustrates $R_{\theta,min}$ which is a preset angle smaller than the angle at the determined point D. In other words, a wave front of a plane wave is kept parallel with a wave from 13-2 and passes through the point D positioned on the right boundary of the region 1000 to be imaged.

As described above, the processor 120 may determine a travelling direction of a plane wave passing through both boundaries of an extended transmission range by determining $R_{\theta,min}$ so as to enable a large number of plane waves to pass through a point positioned at an edge of the region 1000 to be imaged.

The above descriptions have been focused on the right boundary of the transducer 110 but may be equally applied to a left boundary. However, an angle of the point D, which is farthest from the transducer 110, may be determined based on one point of the region 1000 to be imaged regardless of the right boundary and the left boundary of the transducer 110. If not, a travelling direction of a plane wave slants a little more as described above, and thus the plane wave may not pass through an outer point.

One $R_{\theta,min}$ has been described above as being determined but is not limited thereto. For example, the processor 120 may divide the region 1000 to be imaged into left and right regions based on a central part of the transducer 100 and respectively differently apply $R_{\theta,min}$ of the left and right regions. In particular, the region 1000 to be imaged may be meaningful if the left and right regions are not symmetrical to each other based on the central part of the transducer 110.

For convenience of description in FIGS. 4A and 4B, $R_{\theta,min}$ has been described as having a positive angle as rotating in a counterclockwise direction based on z axis and as having a negative angle as rotating in a clockwise direction The processor 120 may calculate an angle $\theta_N$ formed by travelling directions of a plurality of plane waves and a vertical line through Equation 7 below:

$$\theta_n = \frac{\phi_2 - \phi_1 + 2R_{\theta,min}}{N-1} \times n + \phi_1 - R_{\theta,min} \quad (7)$$

wherein n=0, 1, 2, . . . , N−1.

According to Equation 7 above, the processor 120 may equally determine travelling directions of different plane waves based on an angle with respect to a travelling direction of a plane wave passing through the both boundaries of the extended transmission range when the number of a plurality of plane waves is preset. For example, if angles with respect to travelling directions of plane waves passing through the both boundaries of the extended transmission range are respectively −60 and 60 when the number of a plurality of plane waves is preset to 7, the processor 120 may determine angles with respect to travelling directions of different plane waves as −40, −20, 0, 20, and 40.

However, the present invention is not limited thereto, and the processor 120 may unequally determine angles with respect to travelling directions of a plurality of plane waves. In particular, travelling directions may be determined so as to enable many more plane waves to pass through a region requiring a high resolution among the region 1000 to be imaged.

Figure 5A:
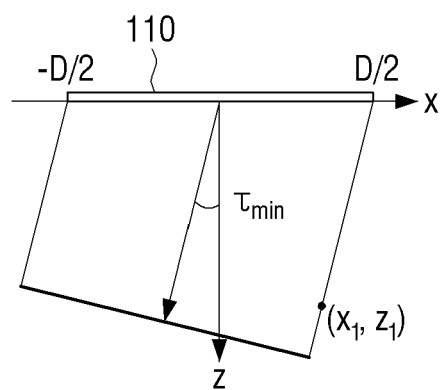
FIGS. 5A through 5C are views illustrating a travelling direction of a plane wave which passes through a particular point of a region to be imaged.
Figure 5B:
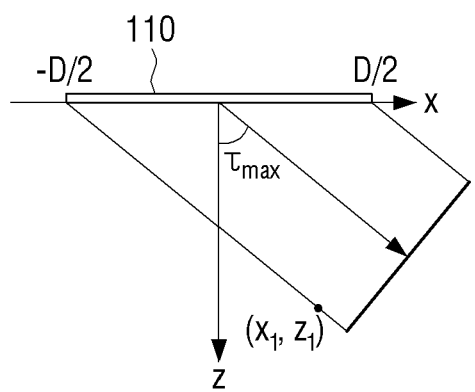
Figure 5C:
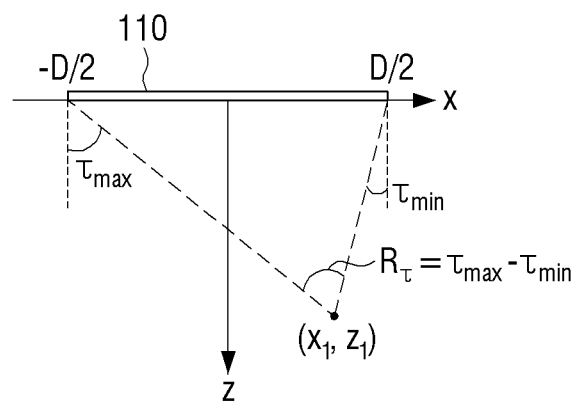

FIGS. 5A through 5C are views illustrating a travelling direction of a plane wave passing through a particular point in the region 1000 to be imaged.

FIG. 5A illustrates a plane waves whose travelling direction passing through a particular point ($x_i$, $z_i$) in the region 1000 to be imaged slants toward a left side of the transducer 120. In this case, a maximum angle formed by the travelling direction of the plane wave and a vertical line perpendicular to the transducer 110 is $\tau_{min}$.

FIG. 5B illustrates a plane wave whose travelling direction passing through the particular point (x1, z1) in the region 1000 to be imaged slants toward a right side of the transducer 110. In this case, a maximum angle formed by the travelling direction of the plane wave and a vertical line perpendicular to the transducer 110 is $\tau_{max}$.

FIG. 5C illustrates a method of acquiring angle $R_\tau = \tau_{max} - \tau_{min}$ which is formed by a first straight line to a first end of both ends of the transducer 110 and a second straight line to a second end as an opposite end of the both ends of the transducer 110 at the particular point (x1, z1) in the region 1000 to be imaged. Here, $\tau_{min}$ is a negative number as described above with reference to FIGS. 4A and 4B.

$R_\tau$ may be regarded as a range of a travelling direction of a plane wave capable of passing through the particular point ($x_1$, $z_1$). Therefore, $R_\tau$ may be changed at each point in the region 1000 to be imaged, and if $R_\tau$ is changed, a resolution may be changed. However, the change in the resolution may not be determined merely with $R_\tau$ and may be described according to the number of plane waves, angles with respect to travelling directions of the plane waves, and a size of the change in R.

Figure 6:
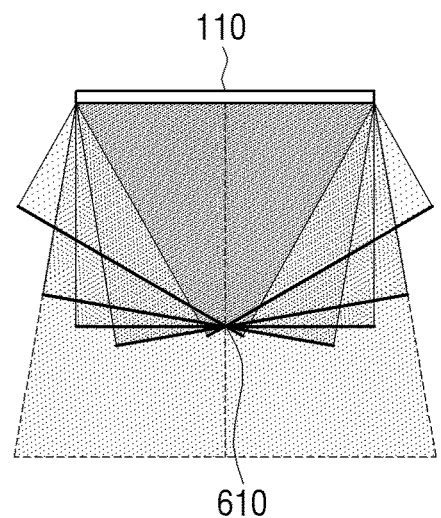
FIG. 6 is a view illustrating a passing plane wave which changes according to points of a region to be imaged, according to an operation of an ultrasonic device according to an exemplary embodiment of the present invention.
Figure 6:
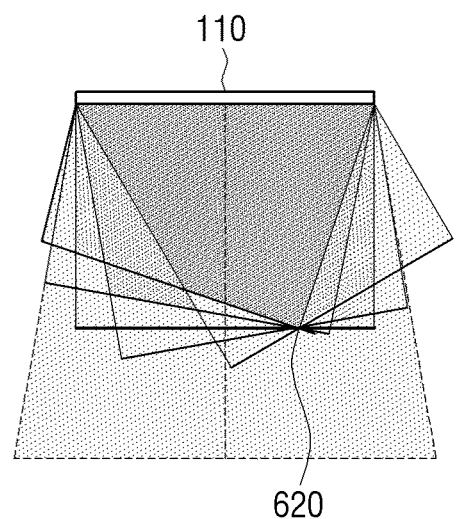
Figure 6:
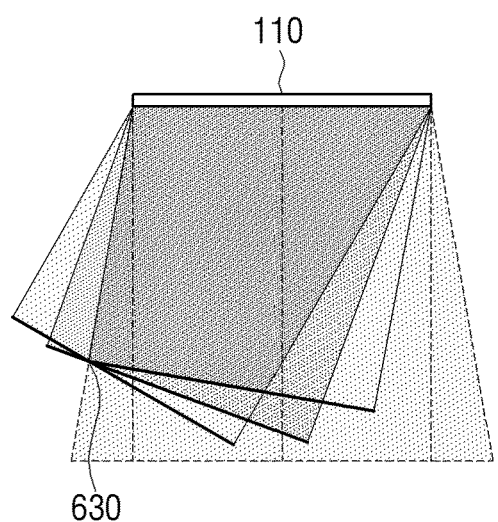

FIG. 6 is a view illustrating a passing plane wave which is changed according to points in the region 1000 to be imaged, according to an operation of an ultrasonic device according to an exemplary embodiment of the present invention.

Referring to left and middle drawings of FIG. 6, five plane waves may pass through each point. Referring to a right drawing of FIG. 6, three plane waves may pass through a corresponding point. In other words, a resolution of each point of the left and middle drawings of FIG. 6 may be different from a resolution of the corresponding point of the right drawing.

This difference in the resolution may appear all over the region 1000 to be imaged. In other words, a resolution of a region of the region 1000 to be imaged, which is far from the transducer 110 or a region, which slants toward a left or right side of the transducer 110, may be lowered.

However, an exemplary embodiment making the difference in the resolution equal is possible. If a point through which the minimum number of plane waves passes is recognized among points of at least a predetermined partial region, the processor 120 may image the at least predetermined partial region by synthesizing a plurality of reflected ultrasonic signals having the number corresponding to the minimum number at each of points in the at least predetermined partial region.

For convenience of description, three points illustrated in FIG. 6 will be described. According to the three points illustrated in FIG. 6, a point through which the minimum number of plane waves pass is a point illustrated in the right drawing and is 3. Therefore, the processor 120 may image a corresponding point by using merely ultrasonic signals reflected from three plane waves even at points illustrated in the left and middle drawings of FIG. 6.

Figure 7A:
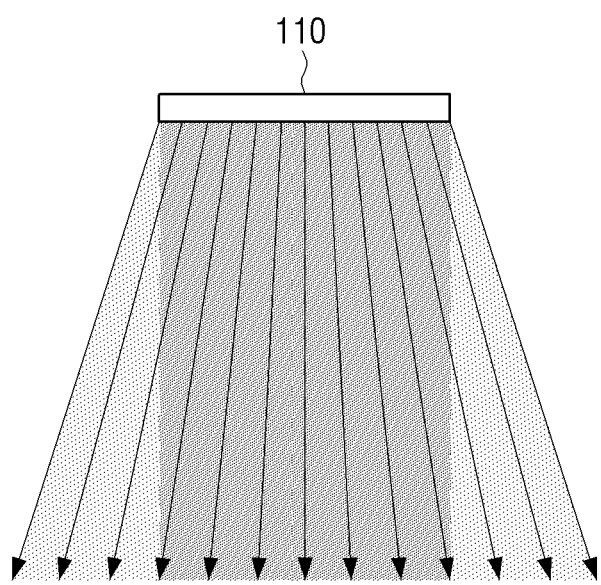
FIGS. 7A through 7C are views illustrating methods of setting scanning lines according to various exemplary embodiments of the present invention.
Figure 7B:
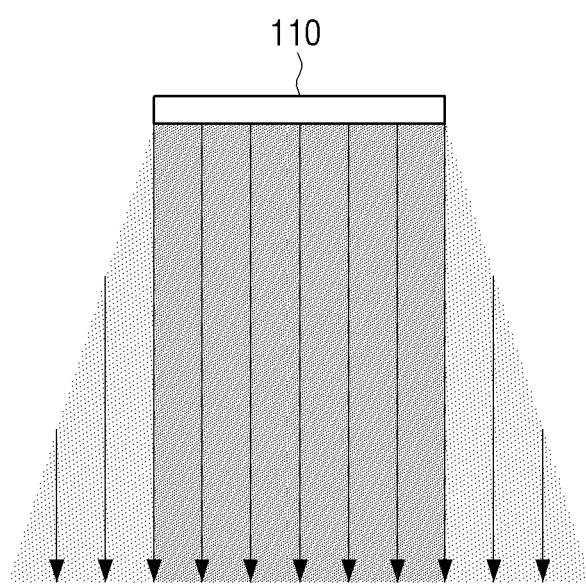
Figure 7C:
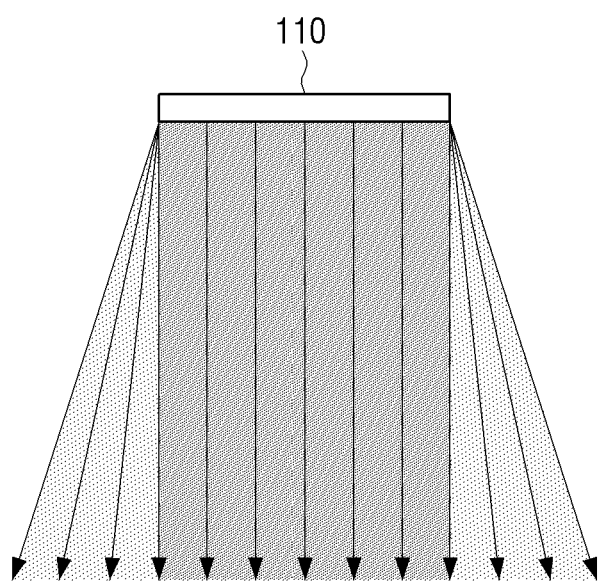

FIGS. 7A and 7C are views illustrating methods of setting scanning lines according to various exemplary embodiments of the present invention.

Referring to FIG. 7A, the processor 120 may image at least a predetermined partial region in an extended transmission range by setting a plurality of scanning lines at different scanning angles so as to correspond to a shape of the at least predetermined partial region and synthesizing a plurality of ultrasonic signals reflected from at least one point on the plurality of scanning lines.

Referring to FIG. 7B, the processor 120 may image at least a predetermined partial region in an extended transmission range by setting a plurality of scanning lines to be parallel with one another in a direction perpendicular to the transducer 110 and synthesizing a plurality of ultrasonic signals reflected from at least one point on the plurality of scanning lines.

Figure 8:
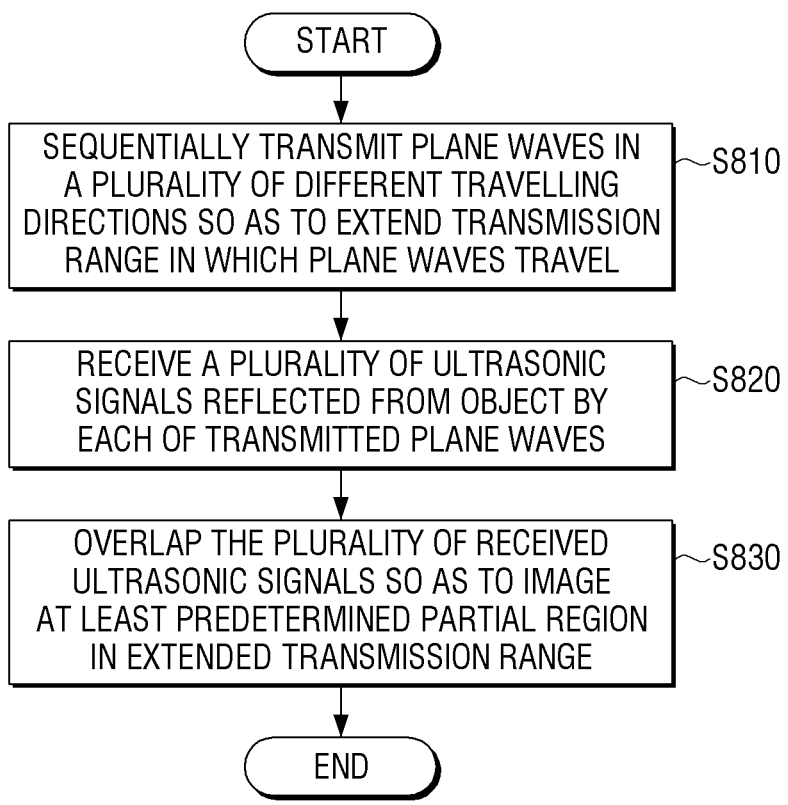
FIG. 8 is a flowchart of an ultrasonic imaging method according to an exemplary embodiment of the present invention.

Referring to FIG. 7C, the processor 120 may image at least a predetermined partial region in an extended transmission range by setting a plurality of scanning lines to be parallel with one another in a direction perpendicular to the transducer 110 in a partial region of a predetermined region to be imaged, setting the plurality of scanning lines at different scanning angles in a remaining region, and synthesizing a plurality of ultrasonic signals reflected from at least one point on the plurality of scanning lines FIG. 8 is a flowchart of a method of an ultrasonic imaging method according to an exemplary embodiment of the present invention.

In operation 5810, a transmission range in which plane waves travel may be extended by sequentially transmitting the plane waves in a plurality of different travelling directions. In operation 5820, a plurality of ultrasonic signals reflected from an object by each of the transmitted plane waves are received. In operation 5830, at least a predetermined partial region in the extended transmission range is imaged by synthesizing the plurality of received ultrasonic signals.

Also, operation 5810 may include determining the extended transmission range based on a position and a size of a region to be imaged, differently determining travelling directions of the plane waves so as to dispersedly transmit the preset number of plane waves in the extended transmission range, and transmitting the plane waves in the determined travelling directions.

Operation 5810 may also include determining a point where an angle formed by a first straight line to a first end of both ends of a transducer and a second straight line to a second end as an opposite end of the both ends of the transducer is smallest and determining a travelling direction of a plane wave passing through both boundaries of the extended transmission range.

In addition, in operation 5830, if a point through which the minimum number of plane waves pass is recognized among points in the at least predetermined partial region, the at least predetermined partial region may be imaged by synthesizing a plurality of reflected ultrasonic signals having the number corresponding to the minimum number at each of points in the at least predetermined partial region.

Moreover, in operation 5830, the at least predetermined partial region may be imaged by setting a plurality of scanning lines at different scanning angles so as to correspond to a shape of the at least predetermined partial region and synthesizing a plurality of ultrasonic signals reflected from at least one on the plurality of scanning lines.

In operation 5830, the at least predetermined partial region may be imaged in the extended transmission range by setting a plurality of scanning lines to be parallel with one another in a direction perpendicular to a transducer and synthesizing a plurality of ultrasonic signals reflected from at least one point on the plurality of scanning lines.

In operation 5830, the at least predetermined partial region may be image in the extended transmission range by setting a plurality of scanning lines to be parallel with one another in a direction perpendicular to the transducer in a partial region of a predetermined region to be imaged, setting the plurality of scanning lines at different scanning angles in a remaining region, and synthesizing a plurality of ultrasonic signals reflected from at least one point on the plurality of scanning lines.

According to various exemplary embodiments of the present invention as described above, an ultrasonic device may provide an extended region which provides a uniform resolution at each point and is to be imaged by extending a transmission range in which a plane wave travels so as to correspond to a region that a user wants to image.

An ultrasonic imaging method according to the various exemplary embodiments of the present invention as described above may be embodied as computer executable program codes and then provided for servers or devices with being stored on various types of non-transitory computer readable media so as to be executed by a processor.

For example, there may be provided a non-transitory computer readable medium that stores a program sequentially performing extending a transmission range in which plane waves travel by sequentially transmitting plane waves in a plurality of different travelling directions, receiving a plurality of ultrasonic signals reflected from an object by each of the transmitted plane waves, and imaging at least a predetermined partial region in the extended transmission range by synthesizing the plurality of received ultrasonic signals.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

The invention claimed is:

1. An ultrasonic device comprising:
a transducer for transmitting a plane wave; and
a processor for controlling the transducer to sequentially transmit plane waves in a plurality of different travelling directions and thereby extend a transmission range in which the plane waves travel,
wherein the transducer receives a plurality of ultrasonic signals which are reflected from an object by each of the transmitted plane waves, and the processor synthesizes the plurality of received ultrasonic signals so as to image at least a predetermined partial region in the extended transmission range, and
wherein when a point through which the minimum number of plane waves pass is recognized among points in the at least predetermined partial region, the processor images the at least predetermined partial region by synthesizing a plurality of reflected ultrasonic signals having the number corresponding to the minimum number at each of the points of the at least predetermined partial region.

2. The ultrasonic device of claim 1, wherein the processor determines the extended transmission range based on a position, a resolution and a size of the region to be imaged, differently determines travelling directions of the plane waves so as to dispersedly transmit the preset number of plane waves in the extended transmission range, and controls the transducer to transmit the plane waves in the determined travelling directions.

3. The ultrasonic device of claim 2, wherein the processor determines a point where an angle formed by a first straight line to a first end of both ends of the transducer and a second straight line to a second end as an opposite end of the both ends of the transducer is smallest, in the region to be imaged and determines a travelling direction of a plane wave passing through the both boundaries of the extended transmission range based on an angle at the determined point.

4. The ultrasonic device of claim 3, wherein angles $\theta_0$ and $\theta_{N-1}$, which are formed by travelling directions of plane waves passing through the both boundaries of the extended transmission range and a vertical line perpendicular to the transducer, are respectively calculated through Equation below:

$$\theta_0 = \phi_1 - R_{\theta,min}$$

$$\theta_{N-1} = \phi_2 + R_{\theta,min}$$

wherein N denotes the number of a plurality of plane waves, $\phi_1$ denotes an angle which has a negative number and a size formed by a third straight line to a first end among points extended toward the first end in the region to be imaged, a third straight line at a point where an angle formed by a vertical line perpendicular to the transducer 110 is largest, and a vertical line, $\phi_2$ denotes an angle which has a positive number and a size formed by a fourth straight line to a second end among points extended toward the second end in the region to be imaged, and a fourth straight line at a point where an angle formed by a vertical line is largest, and the vertical line, and $R_{\theta,min}$ denotes a preset angle smaller than or equal to the angle at the determined point D.

5. The ultrasonic device of claim 4, wherein an angle $\theta_N$ which is formed by the travelling directions of the plurality of plane waves and the vertical line is calculated through Equation below:

$$\theta_n = \frac{\phi_2 - \phi_1 + 2R_{\theta,min}}{N-1} \times n + \phi_1 - R_{\theta,min}$$

wherein n=0, 1, 2, ..., N−1.

6. The ultrasonic device of claim 1, wherein the processor images the at least predetermined partial region in the extended transmission range by setting a plurality of scanning lines at different scanning angles so as to correspond to a shape of the at least predetermined partial region and synthesizing a plurality of ultrasonic signals reflected from at least one point on the plurality of scanning lines.

7. The ultrasonic device of claim 1, wherein the processor images the at least predetermined partial region in the extended transmission range by setting a plurality of scanning lines to be parallel with one another in a direction perpendicular to the transducer and synthesizing a plurality of ultrasonic signals reflected from at least one point on the plurality of scanning lines.

8. The ultrasonic device of claim 1, wherein the processor images the at least predetermined partial region in the extended transmission range by setting a plurality of scanning lines to be parallel with one another in a direction perpendicular to the transducer in the at least predetermined partial region of the region to be imaged, setting the plurality of scanning lines at different scanning angles in a remaining region, and synthesizing a plurality of ultrasonic signals reflected from at least one point on the plurality of scanning lines.

9. An ultrasonic imaging method comprising:
sequentially transmitting plane waves in a plurality of different travelling directions so as to extend a transmission range in which the plane waves travel;
receiving a plurality of ultrasonic signals reflected from an object by each of the transmitted plane waves; and
synthesizing the plurality of received ultrasonic signals so as to image at least a predetermined partial region in the extended transmission range,
wherein the imaging comprises, when a point through which the minimum number of plane waves travels is recognized among points in the at least predetermined partial region, synthesizing a plurality of reflected ultrasonic signals having the number corresponding to the minimum number at each of the points in the at least predetermined partial region so as to image the at least predetermined partial region.

10. The ultrasonic imaging method of claim 9, wherein the extending comprises:

determining the extended transmission range based on a position, a resolution and a size of a region to be imaged;

differently determining travelling directions of the plane waves so as to dispersedly transmit the preset number of plane waves in the extended transmission range; and transmitting the plane waves in the determined travelling directions.

11. The ultrasonic imaging method of claim 10, wherein the extending comprises:

determining a point where an angle formed by a first straight line to a first end of both ends of a transducer and a second straight line to a second end as an opposite end of the both ends of the transducer is smallest; and determining a travelling direction of a plane wave passing through both boundaries of the extended transmission range based on an angle at the determined point.

12. The ultrasonic imaging method of claim 11, wherein angles $\theta_0$ and $\theta_{N-1}$, which are formed by travelling directions of plane waves passing through the both boundaries of the extended transmission range and a vertical line perpendicular to the transducer, are respectively calculated through Equation below:

$$\theta_0 = \varphi_1 - R_{\theta,min}$$

$$\theta_{N-1} = \varphi_2 + R_{\theta,min}$$

wherein N denotes the number of a plurality of plane waves, $\varphi_1$ denotes an angle which has a negative number and a size formed by a third straight line to a first end among points extended toward the first end in the region to be imaged, a third straight line at a point where an angle formed by a vertical line perpendicular to the transducer 110 is largest, and a vertical line, $\varphi_2$ denotes an angle which has a positive number and a size formed by a fourth straight line to a second end among points extended toward the second end in the region to be imaged, and a fourth straight line at a point where an angle formed by the vertical line is largest, and the vertical line, and $R_{\theta,min}$ denotes a preset angle smaller than or equal to the angle at the determined point D.

13. The ultrasonic imaging method of claim 12, wherein an angle $\theta_N$ which is formed by the travelling directions of the plurality of plane waves and the vertical line is calculated through Equation below:

$$\theta_n = \frac{\phi_2 - \phi_1 + 2R_{\theta,min}}{N-1} \times n + \phi_1 - R_{\theta,min}$$

wherein n=0, 1, 2, ..., N−1.

* * * * *

UNITED STATES PATENT AND TRADEMARK OFFICE
CERTIFICATE OF CORRECTION

| | |
|---|---|
| PATENT NO. | : 10,725,158 B2 |
| APPLICATION NO. | : 15/768535 |
| DATED | : July 28, 2020 |
| INVENTOR(S) | : Mun-Kyeong Hwang et al. |

It is certified that error appears in the above-identified patent and that said Letters Patent is hereby corrected as shown below:

On the Title Page

Item (71) "Samsung Electronics Co., Ltd." should be deleted from the list of the applicants.

Signed and Sealed this
Fifteenth Day of September, 2020

Andrei Iancu
*Director of the United States Patent and Trademark Office*